(12) United States Patent
Salzmann et al.

(10) Patent No.: US 11,885,278 B2
(45) Date of Patent: Jan. 30, 2024

(54) CYLINDER HEAD GASKET

(71) Applicant: Reinz-Dichtungs-GmbH, Neu-Ulm (DE)

(72) Inventors: Jochen Salzmann, Neu-Ulm (DE); Johann Waldvogel, Krumbach (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 0 days.

(21) Appl. No.: 17/219,660

(22) Filed: Mar. 31, 2021

(65) Prior Publication Data
US 2021/0301759 A1   Sep. 30, 2021

(30) Foreign Application Priority Data
Mar. 31, 2020   (DE) .................. 20 2020 101 730.6

(51) Int. Cl.
*F02F 11/00*   (2006.01)
*F16J 15/08*   (2006.01)

(52) U.S. Cl.
CPC ......... *F02F 11/002* (2013.01); *F16J 15/0818* (2013.01)

(58) Field of Classification Search
CPC .... F16J 15/0818; F16J 15/0825; F02F 11/002
See application file for complete search history.

(56) References Cited

U.S. PATENT DOCUMENTS

| | | | |
|---|---|---|---|
| 4,312,512 A | 1/1982 | Conte et al. | |
| 4,976,225 A | 12/1990 | Stang et al. | |
| 5,628,518 A * | 5/1997 | Ushio | F16J 15/0825 277/922 |
| 7,111,505 B2 * | 9/2006 | Kestly | F02F 11/002 73/114.18 |
| 10,174,872 B2 * | 1/2019 | Yamamoto | F16J 15/061 |
| 2005/0115311 A1 * | 6/2005 | Kestly | F02F 11/002 73/114.18 |
| 2006/0096362 A1 * | 5/2006 | Vialard | F16J 15/064 73/114.18 |
| 2011/0239749 A1 * | 10/2011 | Toth | F16J 15/0818 73/114.18 |
| 2020/0408303 A1 * | 12/2020 | Gruhler | F16J 15/0818 |

FOREIGN PATENT DOCUMENTS

| DE | 3509136 A1 | 9/1986 |
|---|---|---|
| EP | 0041906 A1 | 12/1981 |

* cited by examiner

*Primary Examiner* — Eugene G Byrd
*Assistant Examiner* — L. Susmitha Koneru
(74) *Attorney, Agent, or Firm* — McCoy Russell LLP

(57) ABSTRACT

A cylinder head gasket is disclosed having a carrier layer, in which at least one through-opening for a combustion chamber is located, and a combustion chamber sealing element, which is inserted in the through-opening and extends in an intrinsically closed manner. In some examples, at least one gap is formed at least in some sections between the carrier layer and the combustion chamber sealing element, the gap extending around the combustion chamber sealing element at least in some sections. Further, in some example, the carrier layer has at least one slot-like or groove-like channel, which extends from the at least one gap between the carrier layer and the combustion chamber sealing element to the outer edge of the carrier layer.

13 Claims, 3 Drawing Sheets

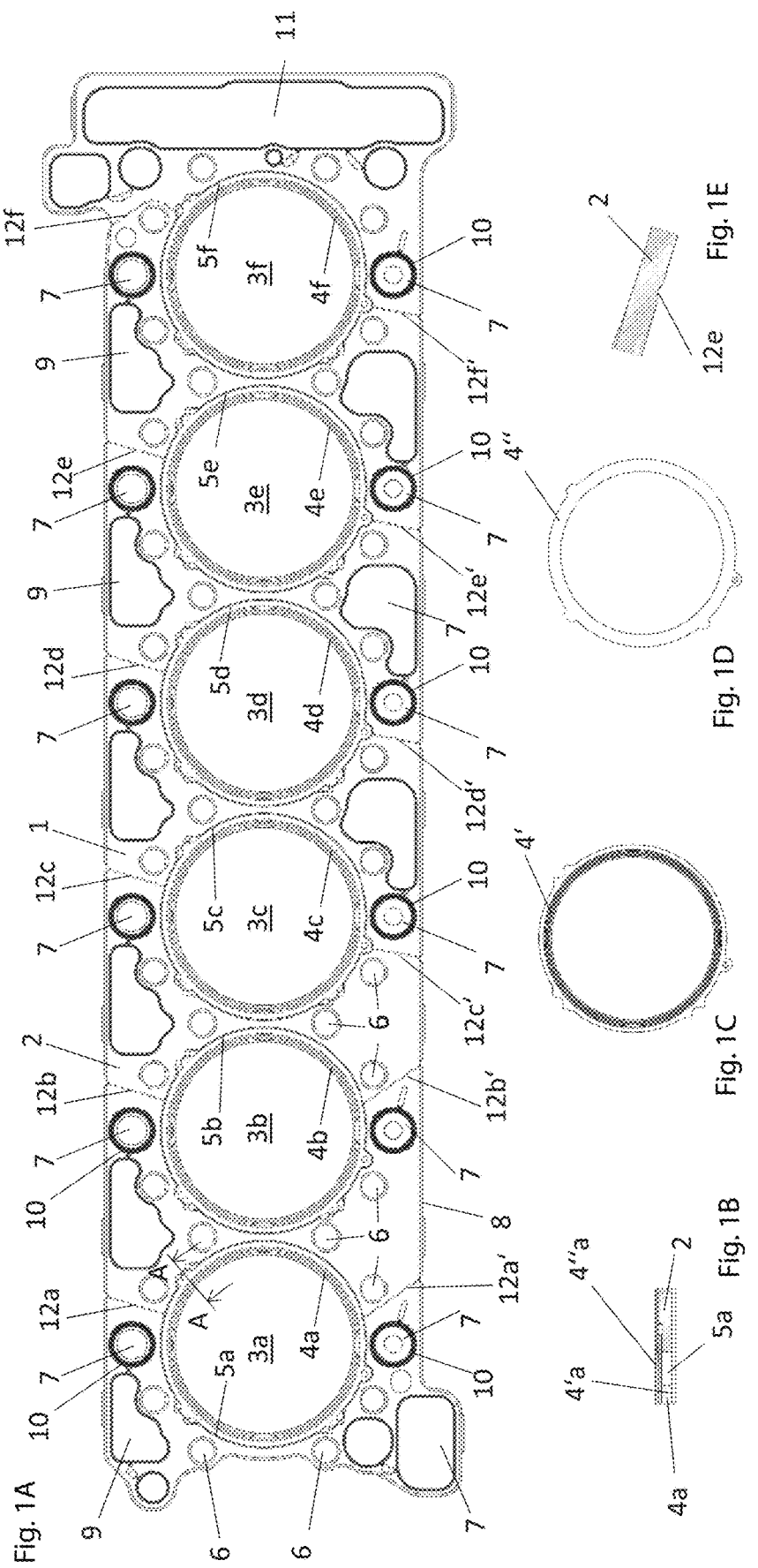

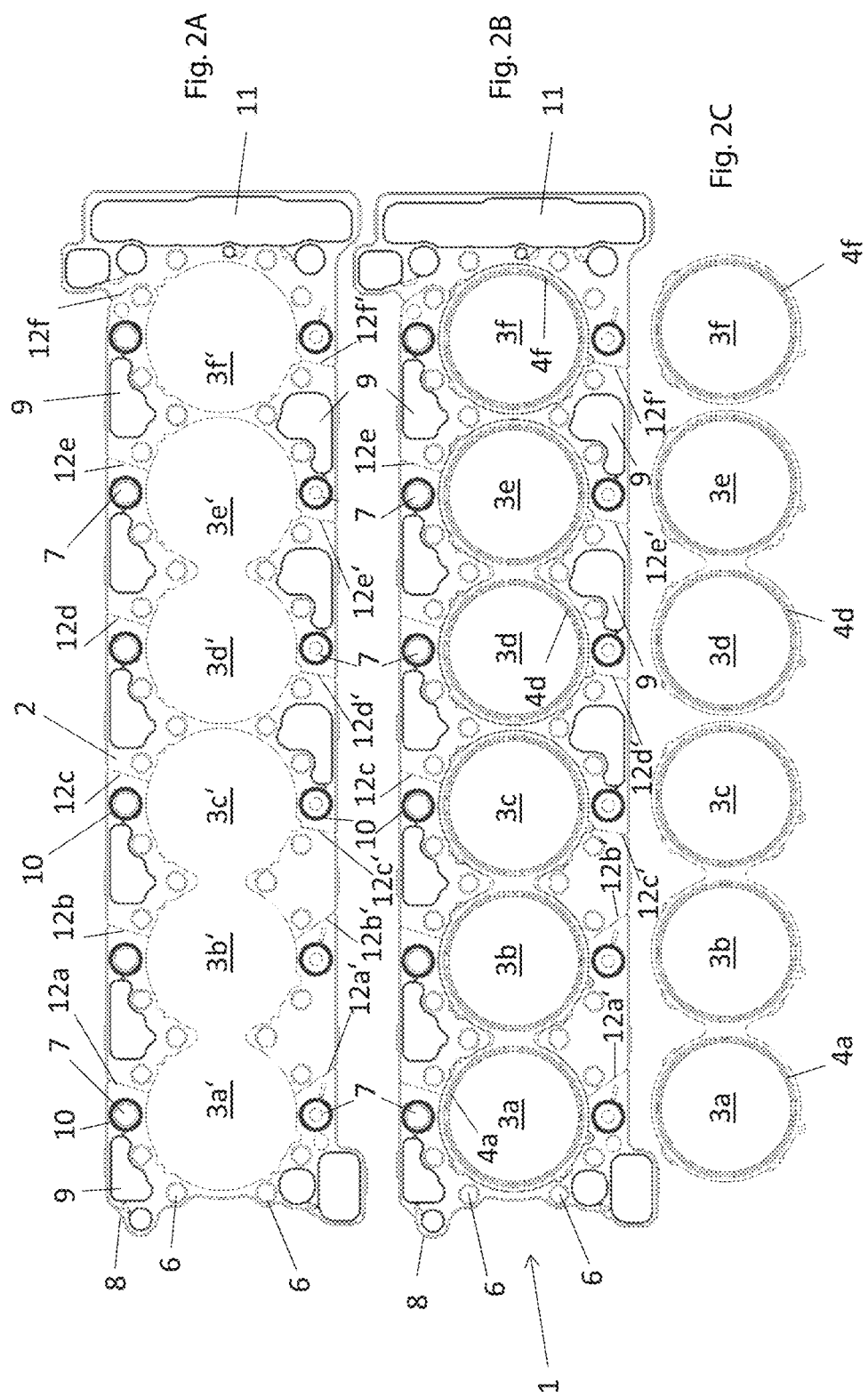

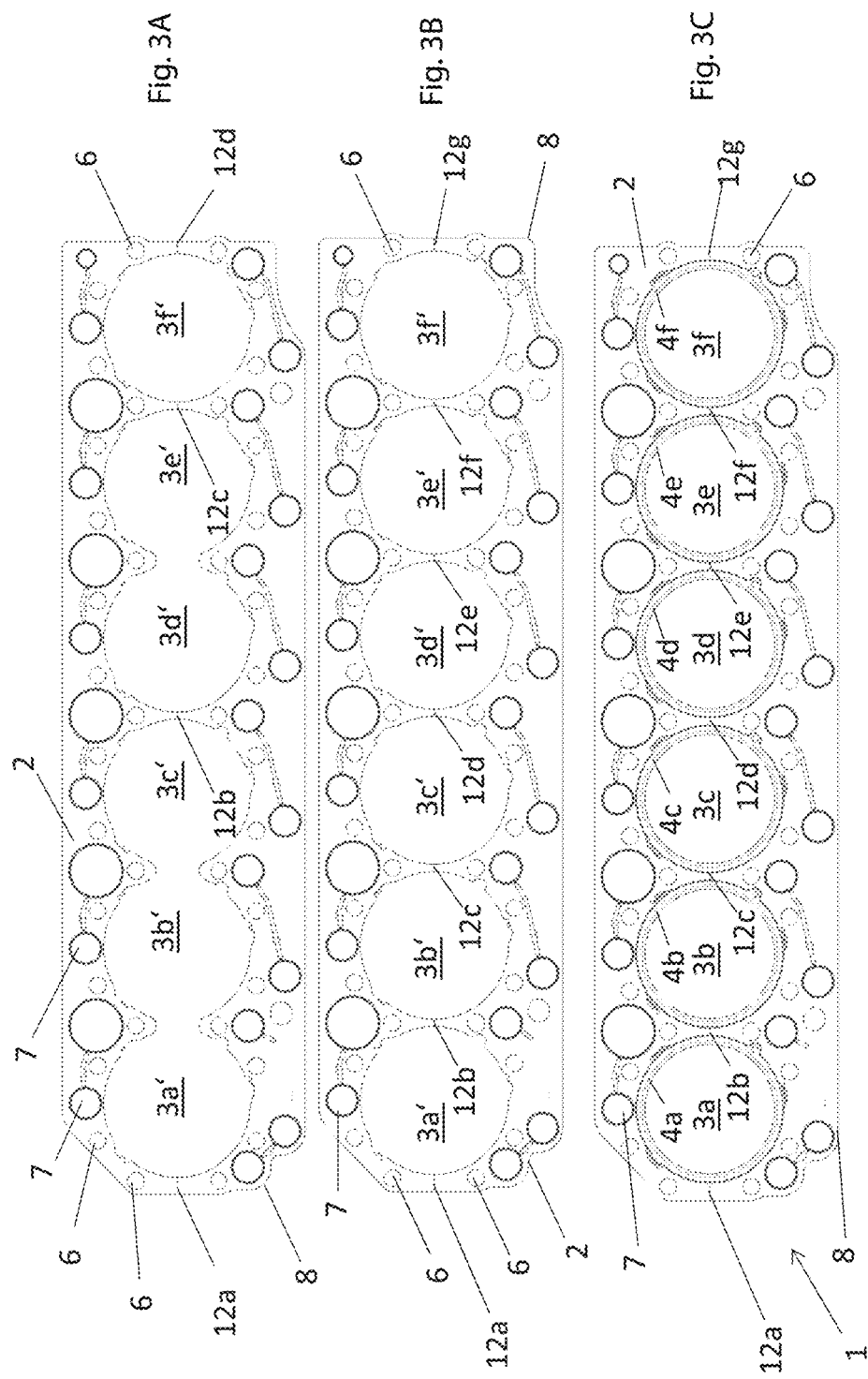

CYLINDER HEAD GASKET

CROSS-REFERENCE TO RELATED APPLICATION

The present application claims priority to German Utility Model Application No. 20 2020 101 730.6, entitled "CYLINDER HEAD GASKET," and filed on Mar. 31, 2020. The entire contents of the above-listed application are hereby incorporated by reference for all purposes.

TECHNICAL FIELD

The present invention relates to a cylinder head gasket.

BACKGROUND AND SUMMARY

Cylinder head gaskets are used in internal combustion engines of motor vehicles. There are various types of such internal combustion engines and cylinder head gaskets. By way of example, cylinder head gaskets may be configured in such a way that they have sealing structures, for example sealing beads, extending in one of the layers thereof around the combustion chamber through-openings. However, such sealing structures may also be formed in separate inserts, which are inserted in the combustion chamber through-openings of one of the layers of a cylinder head gasket. To this end, the through-opening in the layer of the cylinder head gasket is provided with a larger radius than the combustion chamber, so that the combustion chamber insert extending in a ring-shaped manner around the combustion chamber can additionally be inserted in the cylinder head gasket. A small gap is created between the combustion chamber insert and the surrounding layer of the cylinder head gasket. Creeping gases coming from the combustion chamber can pass into this gap. These creeping gases may additionally expand into the spaces between the cylinder head gasket and the engine block and/or between the cylinder head gasket and the cylinder head, and thus may damage elastomeric seals that are present in the region of the cylinder head gasket. In particular, the elastomeric seals arranged in the so-called hinterland of a cylinder head gasket, i.e. remote from the combustion chamber through-openings, for example at secondary through-holes of the cylinder head gasket, such as for example for cooling water, oil, oil return or screws, or at the outer edge of a layer of the cylinder head gasket, may become detached from the layer of the cylinder head gasket and may be pushed for example into the respective openings.

Since the creeping gases, as combustion gases, are at a high temperature, the elastomeric seals in the hinterland of the cylinder head gasket may also become damaged by the high temperature of the creeping gases. If the elastomeric seals of the cylinder head gasket are damaged, the creeping gases, i.e. combustion gases, may enter the respective channels/through-openings and contaminate the fluids conducted therein. If the elastomeric seals that extend along the outer edge of the cylinder head gasket are damaged, the creeping gases may also pass into the environment in an uncontrolled manner.

The problem addressed by the present disclosure is therefore that of providing a cylinder head gasket in which creeping gases are prevented from passing in an uncontrolled manner into the gap between the layer of the cylinder head gasket and the engine block and/or the cylinder head.

This problem is solved by the cylinder head gasket according to claim 1. Advantageous developments of the cylinder head gasket according to the disclosure will be specified in the dependent claims.

The cylinder head gasket according to the disclosure has at least one layer, also referred to as the carrier layer in the case of a single-layer cylinder head gasket, in which at least one through-opening for a combustion chamber is located. However, it is also possible to arrange further layers adjacent to the carrier layer. The gasket is, for example, a single-cylinder gasket or else a cylinder head gasket for multiple combustion chambers arranged adjacent to one another.

The cylinder head gasket also has a combustion chamber sealing element extending in a closed manner around the combustion chambers, which combustion chamber sealing element, as a combustion chamber insert, is inserted in the combustion chamber through-opening in the cylinder head gasket and seals the combustion chambers with respect to the outside.

In the present cylinder head gasket according to the disclosure, a separate insert may be provided for each individual combustion chamber through-opening, or else a common combustion chamber insert may be used for a plurality of adjacent combustion chamber through-openings. In the latter case, the combustion chamber sealing element may be configured in the shape of a pair of spectacles with for example two through-openings or more through-openings. However, the sealing structures stamped into the spectacles must in this case comprise sealing structures extending in an intrinsically closed manner around a respective combustion chamber through-opening, in order to seal each combustion chamber per se.

According to the invention, the carrier layer and the combustion chamber sealing element are configured in such a way that a gap is formed between the combustion chamber sealing element and the carrier layer extending around the at least one through-opening for a combustion chamber. The gap may extend over a section of the circumference of the through-opening, or else may extend all the way around the through-opening. It may also be interrupted by webs, by which the combustion chamber sealing element is attached to the surrounding carrier layer. According to the disclosure, the gap is formed deliberately since it serves in the present disclosure as a receiving space for the creeping gases.

Advantageously, one, several or all of the gaps between a combustion chamber sealing element and the carrier layer has a minimum width of 500 µm, advantageously at least 1400 µm, advantageously 3000 µm. This minimum width exists at least in some sections, advantageously over more than half of the length, advantageously over at least 80% of the length of the gaps or sections thereof.

According to the disclosure, the carrier layer is now configured in such a way that it has a slot-like or groove-like channel, which extends from at least one of the gaps between the carrier layer and a combustion chamber sealing element to the outer edge of the carrier layer. Creeping gases the enter the gap between the combustion chamber sealing element and the carrier layer are guided by this channel to the outer edge of the carrier layer and are released from there into the environment. It is therefore essential that the pressure in the gap, which is built up by the creeping gases entering the gap between the combustion chamber sealing element and the carrier layer, is reduced by the channel. This prevents the creeping gases from passing from the gap between the combustion chamber sealing element and the carrier layer into the flat gap between the carrier layer and the engine block and/or the cylinder head and thus reaching the hinterland of the cylinder head gasket and causing damage to the elastomeric seals located there or entering the fluid holes located there.

The pressure release and the quantity of creeping gases guided to the outer edge can be adjusted by the configuration of the channel, in particular the cross-section thereof and the length thereof between the gap between the combustion chamber sealing element and the carrier layer and the outer edge of the carrier layer. Since the creeping gases are now discharged in a targeted manner via channels, the location at which the creeping gases exit from the gap between the engine block and the cylinder head can also be determined.

The channel according to the disclosure may be configured in a slot-like or groove-like manner. This means that, to form the channel, the carrier layer may on the one hand have an aperture in the form of a slot. Alternatively, the channel may be pressed into the carrier layer, so that the material continuity of the carrier layer in the main layer plane of the carrier layer and transversely to the direction of extension of the channel is not interrupted. If, in a less preferred variant, the channel is stamped into the carrier layer, this leads to the formation of a bead, wherein the bulge in the layer that is formed on the surface of the carrier layer opposite the channel as a result of the bead may need to be compensated by additional measures. In a preferred variant, however, the channel is integrally formed in the carrier layer in such a way that the thickness of the carrier layer is reduced at that location and the surface of the layer opposite the channel is not deformed. The channel thus forms a groove, which has a cross-section that can be adapted in terms of depth and width to the respective requirements.

Advantageously, a separate channel or a plurality of channels are provided for each combustion chamber insert. However, it is also possible to provide only a small number of channels, optionally even just one single channel or a few channels according to the disclosure, which extend from one of the gaps between the combustion chamber sealing elements and the combustion chamber through-openings of a cylinder head gasket to the outer side of the cylinder head gasket. To vent further gaps between combustion chamber sealing elements and through-openings for combustion chambers, these gaps may be connected to one another. It is thus possible also to vent further gaps between combustion chamber sealing elements and through-openings for combustion chambers ultimately via the one or more channels extending to the outer edge of the cylinder head gasket.

Depending on requirements, the channels according to the disclosure between the gap and the outer edge of the carrier layer may extend in a straight line or else in a curved manner, with one or more bends, in particular kinks or the like.

It has proven to be particularly advantageous if at least one of the channels according to the disclosure between gaps or between the gap and the outer edge of the carrier layer do not touch or pass through any further openings or depressions in the carrier layer. This applies in particular to through-openings for cooling fluid, oil, oil return or screws in the cylinder head gasket. One, several or all of the channels will be guided around such openings as required.

It is particularly advantageous here if one, several or all of the channels between the gaps or between the gap and the outer edge of the carrier layer extend exclusively in regions of the carrier layer that are otherwise not deformed; in other words, with the exception of the deformation caused by forming a channel, the channel in question extends exclusively through regions of the carrier layer in which the latter is configured as a non-deformed sheet, in particular as a smooth sheet.

Some examples of cylinder head gaskets according to the disclosure will be given below. In all the figures, identical or similar reference signs will be used for identical or similar elements, and therefore the repetition thereof in the figures or the description may be omitted.

The following examples show examples of cylinder head gaskets according to the disclosure, each of these implementing a variety of optional features in addition to the features essential to the present disclosure. However, it is also possible to implement these optional features individually or in any favored combinations from the same example or from different examples together with the essential features of the present disclosure.

BRIEF DESCRIPTION OF THE FIGURES

In the figures:

FIG. 1A, FIG. 1B, FIG. 1C, FIG. 1D, and FIG. 1E show a cylinder head gasket according to the disclosure;

FIG. 2A, FIG. 2B, and FIG. 2C show a further cylinder head gasket according to the disclosure;

FIG. 3A, FIG. 3B, and FIG. 3C show further cylinder head gaskets according to the disclosure. The figures are drawn to scale, although other relative dimensions may be used if desired.

DETAILED DESCRIPTION

FIGS. 1A-1E show a cylinder head gasket 1 comprising a carrier layer 2. The cylinder head gasket 1 comprises only this single carrier layer 2 and is therefore a single-layer gasket. In principle, however, multilayer gaskets can also be produced according to the disclosure.

In the present example, the carrier layer 2 has a total of six through-openings 3a'-3f' (hereinafter also denoted in general by reference sign 3'), which are formed separately from one other in the carrier layer 2 in the form of an inline six-cylinder engine. The through-openings 3a'-3f' are provided with a larger diameter than the adjacent combustion chamber holes in the cylinder crankcase. Inserted in the through-openings 3a'-3f are combustion chamber sealing elements 4a-4f (hereinafter also denoted in general by reference sign 4), which in turn have combustion chamber through-openings 3a-3f (hereinafter also denoted in general by reference sign 3). These sealing elements are configured as so-called inserts, which have sealing structures for sealing between the combustion chamber passages 3a-3f and the carrier layer 2. In the assembled state, these combustion chamber inserts 4a-4f are also clamped between the cylinder head and the engine block.

FIG. 1A shows an overview of one such carrier layer 2 of a cylinder head gasket 1, while FIGS. 1B-1E show details of this cylinder head gasket 1. FIG. 1C and FIG. 1D show the two layers of a combustion chamber insert 4, namely a combustion chamber ring 4' with stamped sealing structures, for example in the form of a sealing bead that extends all the way around the interior of the combustion chamber ring 4' in an intrinsically closed manner. FIG. 1D shows a smooth layer 4". The two layers 4' and 4", when placed one on top of the other, together form a combustion chamber insert 4, as shown as the combustion chamber insert 4a-4f in FIG. 1A. The two layers 4' and 4" may lie loose one on top of the other or else may be connected to one another. In the case where they are not connected to one another, they are each held in position by the carrier layer, the engine block and the cylinder head.

FIG. 1B shows a cross-section A-A of FIG. 1A in the section showing the region between the combustion chamber insert 4a and the adjacent carrier layer 2.

On the right-hand side of FIG. 1A, an opening 11 in the form of a chain case is also shown. Such chain cases are merely an optional part of a cylinder head gasket.

A gap 5 is formed between the combustion chamber insert 4, comprising the smooth layer 4'' and the combustion chamber ring 4', and the carrier layer 2, and creeping gases coming from the combustion chamber opening 3a can enter said gap. Outside of the connection point, this gap has a depth resulting from the sheet thickness and has a minimum width of 500 μm.

The carrier layer 2 has a plurality of further through-openings, for example for screws in the form of screw holes 6, for cooling fluid in the form of water holes 7, and for example oil return openings 9.

In the cylinder head gasket 1 of FIG. 1A, all of these openings are located in the region between the combustion chamber through-openings 3a-3f and an outer edge 8 of the carrier layer 2.

In the present example of a cylinder head gasket 1, for example, the water holes 7 are surrounded by elastomeric seals 10 applied by injection moulding, which seal the water holes with respect to the adjacent regions of the cylinder head gasket 1. This prevents water coming from the water holes 7 from entering the gap between the carrier layer 2 and the adjacent engine block or cylinder head. In the same way, impurities are prevented from entering the water holes 7 from these gaps. However, the elastomeric seals 10 may easily be damaged by high pressure or heat or may become detached from the carrier layer 2. The entire cylinder head gasket would be damaged as a result.

It is therefore necessary inter alia to prevent creeping gases, which come from the combustion chamber through-openings 3a-3f and enter one of the gaps 5a-5f via the combustion chamber rings 4a-4f, from reaching the elastomeric seal 10 and damaging it.

According to the disclosure, therefore, channels 12a-12f and 12a'-12f are arranged in the carrier layer 2 of the cylinder head gasket 1 according to the disclosure, each of said channels extending from one of the gaps between a combustion chamber ring and the carrier layer to the outer edge 8 of the carrier layer 2.

FIG. 1E shows a cross-section through one such channel 12, here using the example of channel 12e. The channel 12e is configured as a groove in the carrier layer 2. This groove has a maximum depth at the groove bottom of 0.1 mm and a width between the groove walls of 1.5 mm. The channel here is a depression, which does not lead to any elevation on the other surface side of the carrier layer 2. Creeping gases can now be guided by this channel 12e from the gap 5e to the outer edge 8 of the carrier layer 2, in order to prevent a build-up of high pressure in the gap between the combustion chamber ring 4e and the carrier layer 2.

The channels 12a-12e and 12a'-12e' are guided in the shortest connecting line between the gaps 5a-5e and the outer edge 8. The same also applies to the channel 12f between the gap 5f and the outer edge 8. Due to the spatial conditions, the channel 12f is likewise guided in the shortest line between the gap 5f and the outer edge 8, but unlike the other channels it does not extend in a straight line; instead, it extends in a curved manner so as to avoid other through-openings in the carrier layer 2.

Therefore, none of the channels 12a-12f and 12a'-12f extends through any of the other through-openings in the carrier layer 2 and also does not touch any of these other through-openings. The channels 12a-12f and 12a'-12f therefore touch only the gaps 5a-5f.

The combustion chamber rings 4a-4f are each connected to the carrier layer 2 at a plurality of connection points. At these connection points, the gaps 5a-5f between the combustion chamber rings 4a-4f and the carrier layer 2 are possibly interrupted/reduced in height, so that the overall gap between a combustion chamber ring, for example the combustion chamber ring 4a, and the carrier layer 2 has individual sections, which may not be connected to one another. In this case, it is necessary to vent each of the sections separately via a channel or to connect the individual sections to one another by means of channels.

FIGS. 2A-2C show a further cylinder head gasket according to the present disclosure in three different partial images of FIGS. 2A, 2B and 2C. FIG. 2A shows the carrier layer 2 of the cylinder head gasket 1, but without combustion chamber sealing elements. The through-openings 3a', 3b' and 3c' in the carrier layer 2 are now connected to one another and form a common passage. The same applies to the through-openings 3d' and 3e', which together form a through-opening in the shape of a pair of spectacles. The through-opening 3f is configured as an individual through-opening for a combustion chamber.

FIG. 2B shows the cylinder head gasket 1 with inserted combustion chamber sealing elements 4a-4f.

FIG. 2C shows the combustion chamber sealing elements 4a-4f.

The combustion chamber sealing elements 4a, 4b and 4c form a common, interconnected combustion chamber sealing element, which is inserted as such into the common through-opening formed by the through-openings 3a', 3b' and 3c'. The same applies to the spectacles-shaped sealing element, which is formed of individual sealing elements 4d and 4e in the form of a single contiguous sealing element, which is inserted into the common through-opening formed by the through-openings 3d' and 3e'. An individual ring-shaped combustion chamber sealing element 4f is provided for the through-opening 3f.

In the present cylinder head gasket according to the disclosure, channels 12a-12f and 12a'-12f are once again provided, which are configured in exactly the same way as those in FIGS. 1A-1E. This means that each individual through-opening 3a'-3f has two channels 12a, 12a' and 12b, 12b', etc., which vent to the outer edge 8 the gap between the combustion chamber rings 4a-4f and the carrier layer 2 and/or equalize the pressure between the gap and the outside space.

FIGS. 3A-3C show in the partial images of FIGS. 3A and 3B the carrier layer of two different cylinder head gaskets, and in FIG. 3C the carrier layer of FIG. 3B as a cylinder head gasket.

FIG. 3A shows a carrier layer 2.

The through-openings 3a'-3f are essentially configured in the same way as in FIG. 2A, wherein three through-openings 3a'-3c' together form a common opening, two through-openings 3d' and 3e' form a common opening, and the through-opening 3f, separate from the other through-openings 3a'-3e', forms a separate opening. In contrast to FIGS. 2A-2C, however, the channels are configured differently. A channel 12a is provided, which vents outwards to the outer edge 8 the opening formed by the through-openings 3a', 3b' and 3c'. In addition, a channel 12d is provided, which vents the through-opening 3f outwards to the outer edge 8 of the carrier layer 2. Channels 12b and 12c are provided between the openings formed by the through-openings 3a', 3b' and 3c', by the through-openings 3d' and 3e', and by the through-opening 3f, so that a pressure equalization takes place between the gaps created between the combustion chamber inserts and the carrier layer in the respective openings, and creeping gases coming for example from the opening formed by the through-openings 3d' and 3e' can be discharged via the adjacent openings.

FIG. 3B shows the carrier layer 2 of the cylinder head gasket 1 of FIG. 3C without the combustion chamber inserts 4a-4f.

In FIG. 3C, the through-openings 3a-3f are each separate from one another and have their own combustion chamber inserts 4a-4f In this respect, this cylinder head gasket corresponds to that in FIGS. 1A-1E.

In contrast to the cylinder head gasket in FIGS. 1A-1E, however, the channels 12a-12g are guided differently. For the through-opening 3a', a channel 12a is provided, which vents to the outer edge 8 the gap between the combustion chamber insert 4a and the carrier layer 2. In the same way, the gap between the combustion chamber insert 4f and the carrier layer 2 is vented to the outer edge by a channel 12g. Further channels 12b, 12c, 12d and 12e and also 12f are located between the individual through-openings 3a'-3f, each of said channels interconnecting the gaps between a combustion chamber insert and the carrier layer 2 between immediately adjacent through-openings 3a'-3f'. The gaps of the through-openings 3b'-3e' are thus ultimately vented to the outer edge 8 of the carrier layer 2 via the gaps between the combustion chamber insert 4a and the outer edge 8 and between the combustion chamber insert 4f and the carrier layer 2. All the channels 12a-12g extend in a straight line on the respective shortest path of the gaps or outer edge regions to be connected. This applies analogously to FIGS. 3A and 3B.

FIGS. 1A-1E, 2A-2C, and 3A-3C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cylinder head gasket comprising a carrier layer, in which at least one through-opening for a combustion chamber is located, and a combustion chamber sealing element, which is inserted in the at least one through-opening and extends all the way around the through-opening of the combustion chamber in an intrinsically closed manner;
wherein
at least one gap is formed at least in some sections between the carrier layer and the combustion chamber sealing element, wherein the gap is a receiving space for gases, the at least one gap extending around the combustion chamber sealing element at least in some sections; and
the carrier layer has at least one slot-like or groove-like channel, which extends from the at least one gap between the carrier layer and the combustion chamber sealing element to an outer edge of the carrier layer.

2. The cylinder head gasket according to claim 1, wherein the combustion chamber sealing element is configured as a sealing ring.

3. The cylinder head gasket according to claim 1, wherein the combustion chamber sealing element extends around one, two or more through-openings.

4. The cylinder head gasket according to claim 1, wherein the slot-like or groove-like channel is configured at least in some sections as a slot and/or depression with open longitudinal ends.

5. The cylinder head gasket according to claim 1, wherein the gap between the carrier layer and the combustion chamber sealing element has, at least in some sections, a minimum width W of at least 500 μm.

6. The cylinder head gasket according to claim 5, wherein the gap has the minimum width W at least in some sections over at least 50% of its length in a circumferential direction around the combustion chamber sealing element.

7. The cylinder head gasket according to claim 1, wherein the channel between the gap and the outer edge of the carrier layer extends in a straight line or with one or more bends, in particular kinks.

8. The cylinder head gasket according to claim 1, wherein the channel does not touch or pass through any further openings or depressions in the carrier layer.

9. The cylinder head gasket according to claim 1, wherein the channel between the gap and the outer edge of the carrier layer extends exclusively in regions of the carrier layer that are otherwise not deformed.

10. The cylinder head gasket according to claim 4, wherein the at least one channel is between the gap and the outer edge of the carrier layer.

11. A cylinder head gasket comprising:
- a carrier layer, in which at least one through-opening for a combustion chamber is located; and
- a combustion chamber sealing element, which is inserted in the at least one through-opening and extends all the way around the through-opening of the combustion chamber in an intrinsically closed manner;
- wherein at least one gap is formed between the carrier layer and the combustion chamber sealing element, wherein the gap is a receiving space for gases, the at least one gap extending around the combustion chamber sealing element; and
- wherein the carrier layer has at least one channel, which extends from the at least one gap between the carrier layer and the combustion chamber sealing element to an outer edge of the carrier layer.

12. The cylinder head gasket according to claim 1, wherein the combustion chamber sealing element includes a combustion chamber ring and a smooth layer, wherein the combustion chamber ring is, in some sections, spaced away from the carrier layer, forming the at least one gap between the combustion chamber ring and the carrier layer, and wherein the smooth layer is in face sharing contact with the combustion chamber ring and the carrier layer at a point of connection of the combustion chamber sealing element to the carrier layer.

13. The cylinder head gasket according to claim 11, wherein the combustion chamber sealing element includes a combustion chamber ring and a smooth layer, wherein the combustion chamber ring is, in some sections, spaced away from the carrier layer, forming the at least one gap between the combustion chamber ring and the carrier layer, and wherein the smooth layer is in face sharing contact with the combustion chamber ring and the carrier layer at a point of connection of the combustion chamber sealing element to the carrier layer.

* * * * *